F. C. FARGE.
VALVE MECHANISM FOR AUTOMATIC GAS LIGHTING AND EXTINGUISHING APPARATUS.
APPLICATION FILED OCT. 23, 1912.

1,095,390.

Patented May 5, 1914.

2 SHEETS—SHEET 1.

WITNESSES

INVENTOR
Frédéric Charles Farge
BY
ATTORNEY

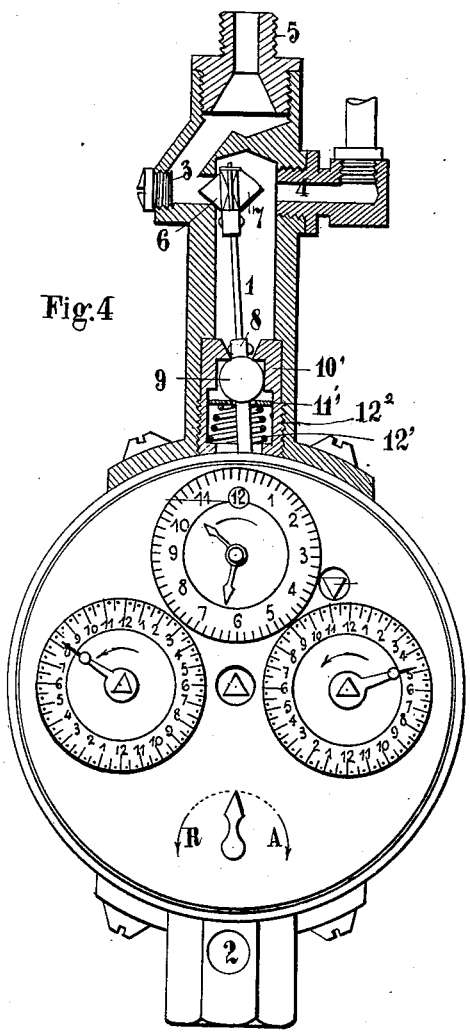

UNITED STATES PATENT OFFICE.

FREDERIC CHARLES FARGE, OF NICE, FRANCE.

VALVE MECHANISM FOR AUTOMATIC GAS LIGHTING AND EXTINGUISHING APPARATUS.

1,095,390.  Specification of Letters Patent.  Patented May 5, 1914.

Application filed October 23, 1912. Serial No. 727,402.

*To all whom it may concern:*

Be it known that I, FREDERIC CHARLES FARGE, a citizen of the Republic of France, and resident of Nice, France, have invented new and useful Improvements in Valve Mechanism for Automatic Gas Lighting and Extinguishing Apparatus, which improvements are fully set forth in the following specification.

This invention relates to valve mechanism for automatic gas lighting and extinguishing apparatus.

Apparatus of this kind already in use necessitate, for insuring tightness of the gas chamber, either grinding keys, or diaphragms which, with time and the low temperatures, fail to operate or are injured, thus rendering the apparatus useless.

The present apparatus is so constructed as to be absolutely reliable and to work well for a very long time. It embodies, primarily, an oscillating rod controlled by an eccentric shifted by the clock-work, said rod being provided with two pointed metal plugs or valves which check or afford a free passage for the gas, as required.

Figure 3:
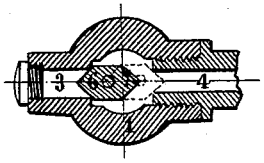
Figure 1:
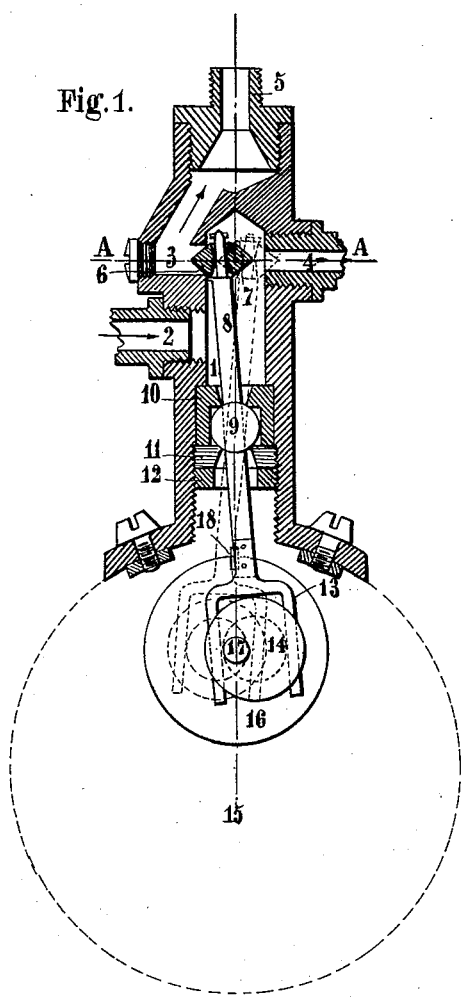
Figure 2:
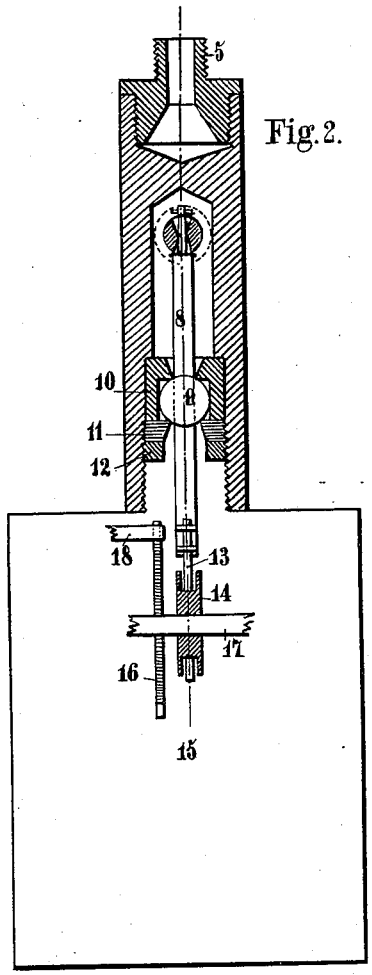

An embodiment of the invention is illustrated in the accompanying drawings, whereof:

Figures 1 and 2 are longitudinal, vertical sections taken at right-angles to each other. Fig. 3 is a horizontal section on line A—A, Fig. 1. Fig. 4 is a part-sectional elevation of the whole device, showing an alternative mounting for the rod.

In the drawings, 1 indicates the gas chamber secured by means of screws to the case of the clock-work 15. The gas flows into this chamber through the nipple 2 and passes out through either the opening 3 or the opening 4, according as it is to be supplied either to the burner or to the pilot light. A nipple 5 permits the attachment of the burner.

A rod 8, provided with a centrally-located metal ball 9, about which as a fulcrum the said rod is adapted to oscillate, carries at its upper end two pointed metal plugs or valves 6 and 7, the valve 6 being designed to close the opening 3, and the valve 7 to close the opening 4. The lower end of this rod is equipped with a fork 13 which straddles a grooved eccentric 14 fixed on the shaft 17 of the clock-work. The ball 9 is disposed in a housing 10, and, in conjunction with the latter, serves to close the gas chamber 1, the said housing being held in place by a clamping screw 11 and a lock-nut 12, which, however, in no way interfere with the oscillation of rod 8.

Instead of the arrangement just described, that shown in Fig. 4 may be employed, wherein the parts 11 and 12 are replaced by a spring 12' which is disposed beneath a washer 11' and forces the latter against the ball 9. This spring is housed within an externally-threaded sleeve $12^2$, which, by being more or less tightened, enables a constant pressure on said ball to be obtained, and, at the same time, the wear, if any, to be taken up.

On shaft 17 (Figs. 1 and 2), is mounted a disk 16 which is provided with two notches, (Figs. 1 and 2), by means of which a slide 18 designed to engage therewith, serves to hold the valve mechanism stationary either in the lighting or in the extinguishing position.

The clock-work, with which the apparatus is furnished, and which controls the lighting and extinguishing of the pilot light and burner, may be of any preferred type. It forms, however, no part of this invention, and, hence, requires neither illustration nor description, it being considered sufficient for present purposes to state that the valve rod 8 is shifted thereby at the proper times, and that the slide 18, which coöperates with the notched disk 16, as above mentioned, is likewise actuated therefrom. In other words, so far as the oscillation of the valve rod 8 is concerned, it is produced by the rotary movement of the eccentric 14, which acts directly upon fork 13, the said movement of the eccentric being effected by the rotation of the disk 16 which, in turn, is produced by the action of the clock-work. During this oscillatory movement of the valve rod, the valves 6 and 7 carried thereby operate to open one of the passages or openings 3 and 4 and close the other, according to the direction of such movement, as will be understood.

In the construction shown in Fig. 4, the upper part of the valve rod is in the form of a steel blade which is sufficiently flexible to prevent it from wedging the valve into its passage or opening, during its movement in one direction, and yet rigid enough to disengage said valve during its return movement.

I claim as my invention:—

1. In a gas lighting and extinguishing apparatus, the combination of a gas chamber having inlet and outlet passages located one below the other; an oscillatory rod arranged therein and provided at one end with a valve for controlling the outlet passage and intermediate its ends with a ball; a hollow bearing element disposed in said chamber below said inlet passage and within which said ball is housed, said bearing element having oppositely-located openings for the extension of said rod therethrough; and actuating means engaged with the other end of said rod.

2. In a gas lighting and extinguishing apparatus, the combination of a vertical gas chamber having an inlet, and a pair of oppositely-located outlets disposed above said inlet; an oscillatory vertical rod arranged in said chamber and provided at its upper end with a pair of valves adapted to be moved into and out of said outlets, to close one and open the other, said rod being provided intermediate its ends with a ball; a hollow bearing element wherein said ball is housed having oppositely-located openings for the extension of said rod therethrough, said bearing element being disposed in said chamber below said inlet; and actuating means engaged with the lower end of said rod.

3. In a gas lighting and extinguishing apparatus, the combination of a gas chamber having inlet and outlet passages; an oscillatory rod arranged in said chamber and provided at one end with a valve for controlling the outlet passage, and intermediate its ends with a ball, said rod having its ball-carrying portion rigid and its valve-carrying portion flexible; a bearing element wherein said ball is housed disposed in said chamber; and actuating means engaged with the other end of said rod.

4. In a gas lighting and extinguishing apparatus, the combination of a gas chamber provided with inlet and outlet passages, and having a portion of its interior wall threaded; an oscillatory rod arranged in said chamber and having a valve at one end for controlling said outlet, and a ball intermediate its ends; a hollow bearing element wherein said ball is housed disposed in said chamber; a spring bearing against said ball; a member adjustably mounted in the threaded portion of said chamber and incasing said spring for controlling the tension of the same; and actuating means engaged with the other end of said rod.

5. In a gas lighting and extinguishing apparatus, the combination of a gas chamber provided with inlet and outlet passages; an oscillatory rod arranged in said chamber and having a valve at one end for controlling said outlet, and a ball intermediate its ends; a hollow bearing element wherein said ball is housed disposed in said chamber; a presser member acting against said ball; means for controlling the pressure exerted by said member; and actuating means engaged with the other end of said rod.

In testimony whereof I have signed this specification in the presence of two subscribing witnesses.

FREDERIC CHARLES FARGE.

Witnesses:
E. CORMIER,
E. RAYMOND.

Copies of this patent may be obtained for five cents each, by addressing the "Commissioner of Patents, Washington, D. C."